United States Patent
Begin et al.

(10) Patent No.: US 7,665,598 B2
(45) Date of Patent: Feb. 23, 2010

(54) ARRANGEMENT FOR ASSEMBLING PRODUCTS IN BATCHES ON HIGH-SPEED CONVEYOR BELT

(75) Inventors: Michel Begin, Octeville sur Mer (FR); Guillaume Duchemin, Octeville sur Mer (FR); Christophe Poupon, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 68 days.

(21) Appl. No.: 11/885,170

(22) PCT Filed: Jan. 30, 2006

(86) PCT No.: PCT/EP2006/050532
§ 371 (c)(1),
(2), (4) Date: Oct. 10, 2007

(87) PCT Pub. No.: WO2006/089831
PCT Pub. Date: Aug. 31, 2006

(65) Prior Publication Data
US 2008/0264763 A1    Oct. 30, 2008

(30) Foreign Application Priority Data
Feb. 28, 2005    (FR) .................................. 05 50528

(51) Int. Cl.
*B65G 47/26* (2006.01)
(52) U.S. Cl. ............... 198/419.3; 198/419.1; 198/459.8
(58) Field of Classification Search ............. 198/419.2, 198/419.3, 459.8, 461.1
See application file for complete search history.

(56) References Cited

U.S. PATENT DOCUMENTS

| | | | |
|---|---|---|---|
| 3,178,007 A | | 4/1965 | Standley et al. |
| 4,630,725 A | * | 12/1986 | Steurmer ................. 198/419.1 |
| 5,147,027 A | * | 9/1992 | Cruver .................... 198/419.3 |
| 5,667,055 A | | 9/1997 | Gambetti |
| 6,766,628 B2 | * | 7/2004 | Guidetti ....................... 53/443 |
| 2004/0154902 A1 | | 8/2004 | Schoeneck et al. |

FOREIGN PATENT DOCUMENTS

| EP | 0 452 560 A1 | 10/1991 |
|---|---|---|
| JP | 5-170332 A | 7/1993 |

* cited by examiner

*Primary Examiner*—James R Bidwell
(74) *Attorney, Agent, or Firm*—Young & Thompson

(57) ABSTRACT

An arrangement (10) for assembling into batches (Ln), via a phasing device (23), a plurality of products (Pn) traveling on a conveyor belt (16) from an intake zone upstream to an exit zone downstream. The phasing device (23) is placed between the intake zone and the exit zone. The arrangement has at least one retractable catch (60, 62, 64), and the catch (60, 62, 64) is moved successively into an engaged position, causing a first product (Pn) to be slowed down until a second product (Pn) located immediately upstream moves up to it, so as to form a batch (Ln), and into a retracted position which enables the previously formed batch (Ln) to continue its downstream movement at the running speed of the belt.

11 Claims, 3 Drawing Sheets

ARRANGEMENT FOR ASSEMBLING PRODUCTS IN BATCHES ON HIGH-SPEED CONVEYOR BELT

BACKGROUND OF THE INVENTION

1. Field of the Invention

The invention relates to an arrangement for assembling products in batches.

The invention relates more specifically to an arrangement for assembling a plurality of products in the form of batches, the arrangement being of the type in which the products are transported on at least one conveyor belt which runs in a longitudinal direction from an intake zone upstream to an exit zone downstream, at a specified speed known as the running speed, in which the products arrive with a specified upstream spacing between two products, and of the type which has a phasing device which is placed on the path of the products so as to form batches of at least two products.

2. Description of the Related Art

This type of arrangement is used in product packaging installations, for example in installations having a conveyor line which conveys the products to a box filling machine which stacks batches of products in packaging crates or boxes.

The conveyor line generally has a conveyor belt which is upstream of the box filling machine, and which transports the products, with a specified spacing between two consecutive products, to an assembly unit having a set of movable transport cells.

The assembly unit has a vacant cell opposite the belt, designed to receive a specified number of products which are to be stacked in the cell to form a batch.

When a batch has been formed in the cell, the cell is moved by one step to enable the assembly unit to position a new vacant cell opposite the belt.

The cells thus move progressively, one step at a time, enabling the batches of products to be conveyed to the box filling machine.

To facilitate and accelerate the filling of the cells, there is a known way of forming the batches of products upstream of the assembly unit, by means of a device called a phasing device.

There is a known way of making the phasing device in the form of a plurality of successive conveyor belts, called timing belts, which operate at different running speeds.

In this type of phasing device, the products are delivered, by a first conveyor belt, onto an upstream acceleration belt operating at a running speed greater than that of the first belt.

The upstream belt conveys the products to an intermediate deceleration belt.

The products are pressed against the intermediate belt and retained thereon by means of a suction device located below.

The intermediate belt shifts each product progressively forward until a batch has been formed on the intermediate belt.

When the batch of products has been formed, the running speed of the intermediate belt increases in order to transfer the batch to a downstream belt which operates at a running speed similar to that of the upstream belt.

This type of phasing device is not entirely satisfactory, since it requires the use of a plurality of conveyor belts placed end to end, giving rise to problems in respect of the overall longitudinal dimension of the installation.

The control of the speed of the different conveyor belts and the lengths of these belts are calculated for a given type of product and batch. It is therefore necessary to set up a new phasing device when the length of the products, or the number of products per batch, is changed.

Furthermore, the suction device does not operate for certain types of products, and this limits the field of application of this phasing device.

Additionally, because of its design, this phasing device cannot be used for processing products at very high speeds, for example at speeds of more than 900 products per minute.

SUMMARY OF THE INVENTION

The object of the invention is, in particular, to overcome these problems by proposing a simple, economical and effective solution.

To this end, the invention proposes an arrangement of the type described above, characterized in that the phasing device is placed between the intake zone and the exit zone of the belt, in that the phasing device has at least one retractable catch, and in that the phasing device moves the catch, successively, into:

- at least one engaged position in which the catch is interposed before a first product and makes contact with it, in order to slow it down until at least a second product located immediately upstream moves up to it, so as to form a batch, and
- at least one retracted position which allows the previously formed batch to continue moving downstream at the running speed.

According to other characteristics of the invention:

- the catch is moved from its engaged position toward its retracted position when the space between the two products in the batch reaches a specified value other than zero;
- in the engaged position, the catch is moved downstream by longitudinal translation, at a specified speed called the deceleration speed which is less than the running speed, until the batch has been formed;
- the phasing device has at least one drive belt which carries at least one catch and which is placed above the upper face of the conveyor belt, and the drive belt is wrapped around at least two drive pulleys in such a way that a lower branch of the drive belt extends substantially parallel to the upper face of the conveyor belt, the catch occupying engaged positions when it is located on the lower branch, and the phasing device has means for rotating the pulleys in such a way that the longitudinal speed at which the catch is driven by the drive belt is equal to the deceleration speed;
- the drive belt has a passive operating state in which it is stopped, each catch occupying a retracted waiting position, and an active operating state in which the drive belt is made to rotate around the pulleys in such a way that a catch is moved longitudinally downstream in the engaged position, and, for each batch to be formed, the drive belt is changed to its active state when a first product is detected by a sensor upstream of the phasing device;
- the phasing device has a first and a second drive belt which are similar and placed in parallel, and which are driven independently, and each drive belt is changed to its active state before the end of the active state of the other belt, in such a way that the forming of a batch starts before the preceding downstream batch has been released;
- when the two drive belts are in the passive state, the waiting positions of the catches of the first drive belt are offset with respect to the waiting positions of the catches of the second drive belt, so as to prevent the crossing of the catches of the two belts;

each drive belt carries at least two similar catches which are regularly spaced along the belt in such a way that, for each belt, only one catch can occupy an engaged position at any time;

the phasing device has means for adjusting the center to center spacing of the two pulleys of each drive belt, in order to adapt the length of the lower branch of each belt to the dimensional and spatial characteristics of the products;

the phasing device has means for automatically correcting the tension of each drive belt according to the center to center spacing between the two pulleys;

the arrangement has a cellular assembly device which is placed at the exit from the belt, each cell being designed to contain one batch of products and to convey this batch toward a downstream processing station.

BRIEF DESCRIPTION OF THE DRAWING FIGURES

Other characteristics and advantages of the invention will be made clear by the following detailed description, the comprehension of which will be facilitated by reference to the attached drawings, in which.

DETAILED DESCRIPTION

Figure 1:
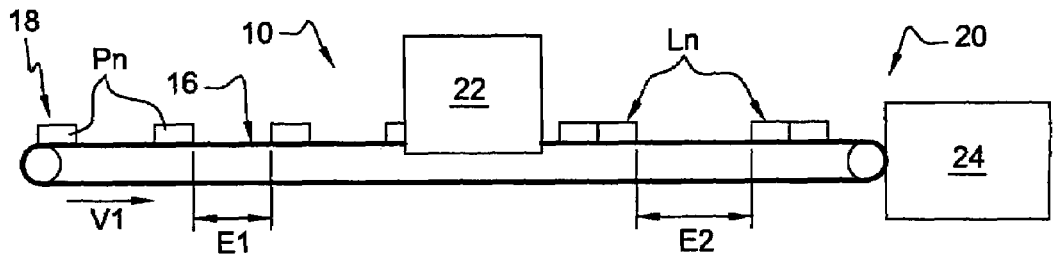
FIG. 1 is a schematic side view of an arrangement according to a first embodiment of the invention, having a phasing device placed above a conveyor belt.

For the description of the invention, the vertical, longitudinal and transverse orientations shown in the figures by the frame of reference V, L, T will be used, without restrictive intent.

In the following description, identical, similar or analogous elements will be denoted by the same reference numerals.

FIG. 1 shows an arrangement 10 for assembling products Pn in the form of batches Ln.

The arrangement 10 has a conveyor belt 16 which runs in a longitudinal direction oriented from upstream to downstream, corresponding to a left-right orientation in FIG. 1.

The belt 16 conveys the products Pn from an intake zone 18 located upstream to an exit zone 20 located downstream.

The belt 16 has a substantially constant running speed V1.

A phasing device 22 according to the teachings of the invention is placed on the paths of the products Pn, between the intake zone 18 and the exit zone 20, so as to form the batches Ln.

In the illustrated example, the phasing device 22 forms batches Ln of two products Pn.

The products Pn arrive upstream of the phasing device 22 with an upstream spacing E1 corresponding to a minimum set value.

The batches Ln leave the phasing device 22 with a downstream spacing E2.

The batches Ln are collected in the exit zone 20 by an assembly device, called an assembly unit 24, which transfers the batches Ln to a downstream processing station (not shown), for example a box filling machine.

According to the teachings of the invention, the phasing device 22 has at least one retractable catch 26, 28.

A first embodiment of the phasing device 22 is shown schematically in FIGS. 2 to 5.

In this case, the phasing device 22 has a drive belt 30 which is placed above the upper face 32 of the belt 16 and which can move two catches 26, 28.

The belt 30 is wrapped around an upstream pulley 34 and a downstream pulley 36 with axes A1, A2, which are transverse with respect to the longitudinal direction.

In this case, the two pulleys 34, 36 are placed above the belt 16 in such a way that the lower branch 38 of the belt 30 extends substantially parallel to the upper face 32 of the belt 16, and in such a way that the catches 26, 28 are substantially centered transversely with respect to the belt 16.

The downstream pulley 36 is designed to be rotated by a servomotor 40 in such a way that the belt 30 is made to rotate around the pulleys 34, 36, and in such a way that the lower branch 38 moves in the same direction as the belt 16. For this purpose, the downstream pulley 36 is rotated in the anticlockwise direction with respect to FIGS. 3 and 4.

The belt 30 carries on its outer face a first catch 26 and a second catch 28, which are similar and placed in substantially opposite positions along the belt 30.

The movement of the belt 30 around the pulleys 34, 36 thus causes the movement of the catches 26, 28.

Each catch 26, 28 has the general shape of a transverse plate perpendicular to the portion of belt 30 which carries it.

The height of the lower branch 38 of the belt 30 and/or the height of each catch 26, 28 above the upper face 32 of the belt 16 is such that, when a catch 26, 28 is located on the lower branch 38, it forms an obstacle to the passage of the products Pn, corresponding to what is called an engaged position of the catch 26, 28.

Figure 3:
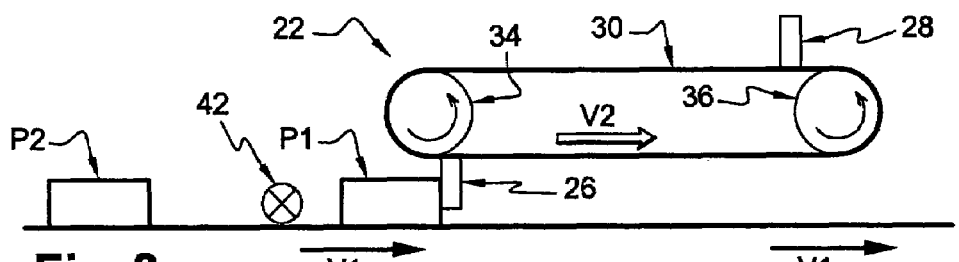
FIG. 3 is a view similar to that of FIG. 2, showing the phasing device with the drive belt in the active state at the start of the engagement of a catch with a product for the formation of a batch of two products.
Figure 4:
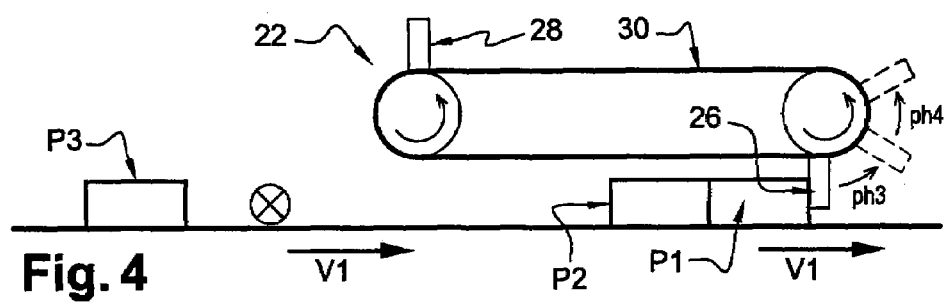
FIG. 4 is a view similar to that of FIG. 2, showing the phasing device with the drive belt in the active state immediately before the batch of products is released.

When a catch 26, 28 occupies an engaged position, the opposite catch 26, 28 occupies a retracted position, as shown in FIGS. 3 and 4, where the first catch 26 occupies an engaged position and the second catch 28 occupies a retracted position.

Figure 2:
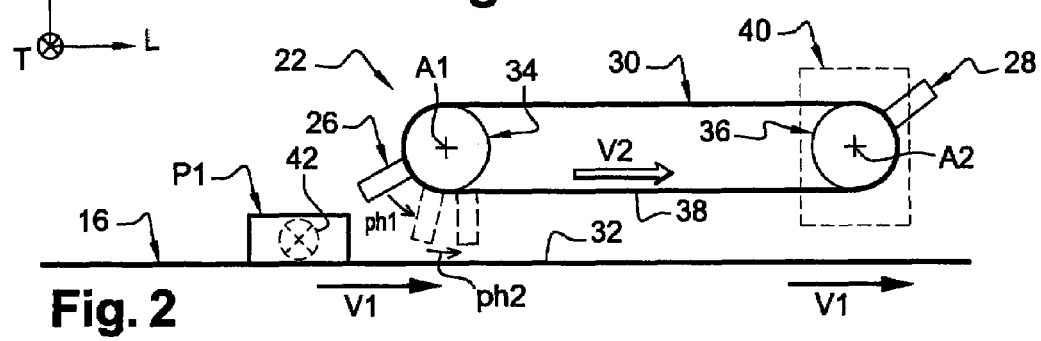
FIG. 2 is a schematic side view of the phasing device of FIG. 1 with the drive belt in the passive state.
Figure 5:
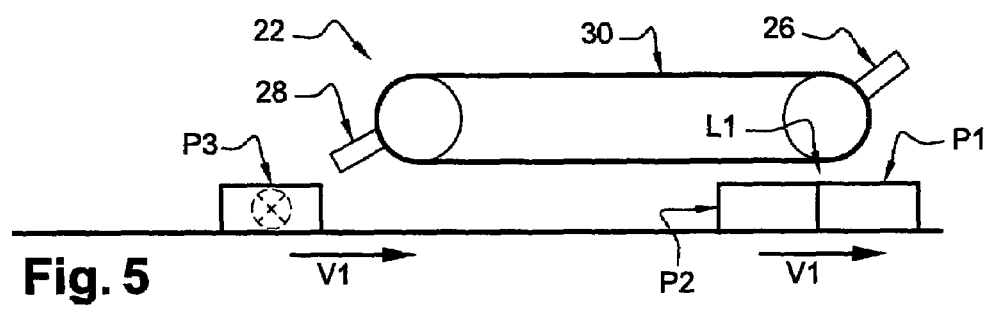
FIG. 5 is a view similar to that of FIG. 2, showing the phasing device with the belt in the passive state immediately after the batch of products has been released and immediately before the engagement of a catch with a new product.

The catches 26, 28 can also occupy intermediate positions, shown in FIGS. 2 and 5, when they are located on the wrapping portions of the belt 30.

In FIG. 2, the intermediate position occupied by the first catch 26 is called the upstream waiting position and the intermediate position occupied by the second catch 28 is called the downstream waiting position. These waiting positions are retracted positions.

In the upstream waiting position, the first catch 26 is located at the height of the upstream pulley 34. It is close to an engaged position, but sufficiently inclined upstream not to interfere with the passage of the products Pn under the lower branch 38 of the belt 30.

In the downstream waiting position, the second catch 28 is located at the height of the downstream pulley 36 and it does not interfere with the passage of the products Pn under the lower branch 38.

In FIG. 5, the two catches 26, 28 occupy positions which are the inverse of those shown in FIG. 2, the second catch 28 occupying an upstream waiting position and the first catch 26 occupying a downstream waiting position.

According to the teachings of the invention, the belt 30 is changed successively to a passive state and to an active state.

In its passive state, as shown in FIGS. 2 and 5, the belt 30 is stopped and the catches 26, 28 occupy their waiting positions.

In the active state of the belt 30, as shown in FIGS. 3 and 4, the servomotor 40 rotates the belt 30 around the pulleys 34, 36, thus causing a longitudinal movement of the catches 26, 28 along the belt 16, at what is called the deceleration speed V2, which is less than the running speed V1 of the belt 16.

Preferably, the deceleration speed V2 is substantially constant.

With reference to FIGS. 2 to 5, the first catch 26 moves downstream from its upstream waiting position to its downstream waiting position, and the second catch 28 moves upstream from its downstream waiting position to its upstream waiting position.

While the first catch 26 is moving downstream, it occupies engaged positions.

Advantageously, the belt 30 is changed to its active and passive states in accordance with the signals emitted by a sensor 42, which is placed between the intake zone 18 and the phasing device 22, and which can detect the arrival of a product Pn on the belt 16.

The sensor 42 is composed, for example, of an electrical cell which is placed at the edge of the belt 16 and which is electrically connected to the servomotor 40, in such a way that the detection of a product P1 on the belt 16 triggers the starting of the servomotor 40 at the correct instant.

It should be noted that the arrangement 10 according to the invention can be provided with an encoder (not shown) which precisely measures the distance traveled by the belt 16 after the sensor 42 has emitted the detection signal for a product Pn.

Because of the encoder, the longitudinal position of the product Pn detected by the sensor 42, with respect to the phasing device 22, is precisely known, thus ensuring that the servomotor 40 is triggered at the correct instant.

This feature is particularly useful in that it enables the arrangement 10 according to the invention to operate reliably at high speed, for example at more than 900 products Pn per minute.

The operation of the phasing device 22 according to the first embodiment is as follows.

When the belt 30 is in a passive state in which the first catch 26 occupies its upstream waiting position (FIG. 2), the sensor 42 detects the arrival of a first product P1.

The detection signal emitted by the sensor 42 causes the starting of the servomotor 40, thus changing the belt 30 from its passive state to its active state, and moving the first catch 26 from its upstream waiting position to its engaged position, as shown in FIGS. 3 and 4.

The first catch 26 is then driven longitudinally downstream at the deceleration speed V2.

Since the deceleration speed V2 of the first catch 26 is less than the running speed V1 of the first product P1, the first product P1 moves up to the first catch 26 and bears on the transverse upstream face of the catch, causing the first product P1 to slide on the belt 16.

The first product P1 then moves longitudinally at the deceleration speed V2 set by the first catch 26, until the first catch 26 comes to occupy a retracted position.

It should be noted that, when the belt 30 is changed from the passive to the active state, the starting of the servomotor 40 includes a preliminary acceleration phase ph1, which enables the belt 30 to change from a longitudinal drive speed VL of zero to a stabilized longitudinal drive speed VL equal to the deceleration speed V2.

Preferably, the upstream waiting position is chosen in such a way that the first catch 26 reaches an intermediate engagement position at the end of the acceleration phase ph1 before it has reached its first vertical engaged position.

In FIG. 2, the intermediate engagement position of the first catch 26 is shown in fine broken lines and the first vertical engagement position of this catch is shown in heavy broken lines.

The phase of movement of the first catch 26 between the intermediate engagement position and the first vertical engaged position is called the engagement phase, ph2.

The instant at which the servomotor 40 is triggered is locked to the signal from the sensor 42 in such a way that the first product P1 comes into contact with the first catch 26 during the engagement phase ph2.

Thus, when the first catch 26 occupies its first vertical engaged position, the first product P1 is blocked by bearing on the first catch 26, as shown in FIG. 3.

Since the second product P2, which is located immediately upstream of the first product P1, moves at the running speed V1 it progressively moves up to the first product P1.

In the embodiment which is described and illustrated, the deceleration speed V2 and the center to center spacing between the two pulleys 34, 36 are chosen in accordance with the running speed V1 and in accordance with the upstream spacing E1 between the products Pn, in such a way that the second product P2 moves up to the first product P1 immediately before the first catch 26 moves from its engaged position to its retracted position, in other words generally at the height of the downstream pulley 36, as shown in FIG. 4.

By moving up to the first product P1, the second product P2 forms a first batch L1 in combination with the first product P1.

On reaching the height of the downstream pulley 36, the first catch 26 is retracted and occupies its downstream waiting position, shown in FIG. 5. The belt 30 then changes from its active state to its passive state.

The swinging of the first catch 26 from a final vertical engaged position, shown in solid lines in FIG. 4, to an intermediate disengagement position, shown in fine broken lines in FIG. 4, is called the disengagement phase ph3.

The batch L1 is released by the first catch 26 during the disengagement phase ph3, thus enabling the batch L1 to continue its longitudinal downstream travel at the deceleration speed V1.

The end of the disengagement phase ph3 corresponds to the start of what is called a deceleration phase ph4, during which the longitudinal speed VL at which the belt 30 is driven changes from the deceleration speed V2 to a zero speed, and during which the first catch 26 moves from its intermediate disengagement position to its downstream waiting position, which is shown in heavy broken lines in FIG. 4.

The phasing device 22 is then ready to process a new batch Ln of products Pn, the second catch 28 occupying its upstream waiting position.

Advantageously, the deceleration speed V2 and the center to center spacing between the upstream pulley 34 and the downstream pulley 36 can be chosen in such a way that the upstream spacing E1 between the two products P1, P2 decreases, under the phasing device 22, to a specified value other than zero, the first product P1 being released before the second product P2 comes into contact with it.

Since the second product P2 is not slowed down by the phasing device 22, it passes under the phasing device 22 at the running speed V1.

This feature is particularly useful for certain types of products Pn known as non-stackable, for example products Pn in bags which do not have rigid bearing surfaces forming precise points of contact between the products Pn. This avoids the risk of the overriding of these products Pn.

The downstream spacing E2 of the batches Ln, at the exit from the phasing device 22, is found to be substantially equal to twice the value of the upstream spacing E1 between the products Pn.

Thus the phasing device 22 enables the batches Ln to be prepared with sufficient spacing to give the assembly unit 24 time to process each batch Ln when the arrangement 10 is operating at high speed.

Figure 6:
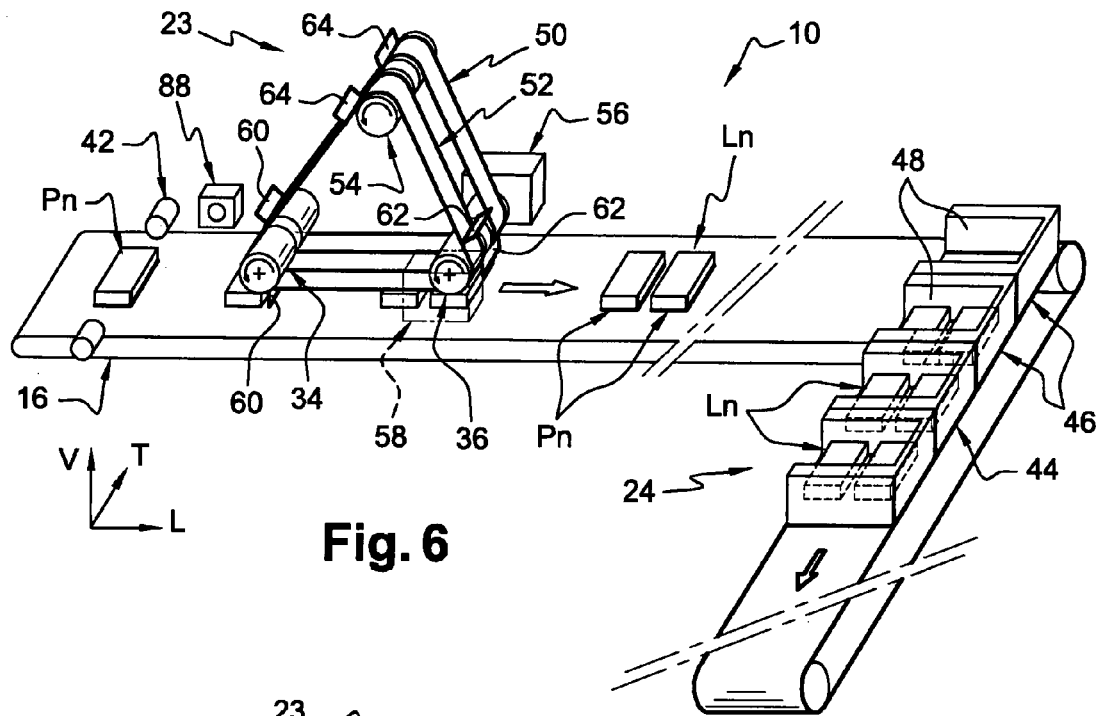
FIG. 6 is a schematic perspective view of an arrangement having a phasing device according to a second embodiment, fitted with a first and a second drive belt in parallel.

An example of an assembly unit 24 of the cellular type is shown in FIG. 6, in relation to a second embodiment of the arrangement 10 according to the invention. This assembly unit 24 is also suitable for the first embodiment.

The assembly unit 24 has a train 44 of cells 46 which is movable in a generally transverse direction with respect to the belt 16.

Each cell 46 delimits a housing 48 in the form of a recess which is open towards the belt 16 so that it can receive a batch Ln in the exit zone 20.

The train 44 of cells 46 moves transversely in steps, so that there is always a vacant cell 46 facing the downstream end of the belt 16, awaiting the arrival of a batch Ln.

When a batch Ln fills the housing 48 of the vacant cell 46, the train 44 of cells 46 moves by one cell 46, so that it can receive the following batch Ln.

Because of the forming of the products Pn into batches Ln upstream of the assembly unit 24, the arrangement 10 according to the invention provides the space and time required for the assembly unit 24 to move the train 44 of cells 46 and present a vacant cell 46 before the following batch Ln.

It should be noted that, if the arrangement 10 were not provided with the phasing device 22 according to the invention, it would be necessary to halve the rate of arrival of the products Pn. This is because the assembly unit 24 would then only have a time interval corresponding to the upstream spacing E1 to move the train 44 of cells 46.

A second embodiment of the arrangement 10 according to the invention, including an improved phasing device 23, will now be described with reference to FIGS. 6 to 12.

The phasing device 23 differs from that of the first embodiment principally in that it has two similar belts 50, 52 placed in parallel, and in that each belt 50, 52 is wrapped around a third pulley 54 which is placed above the associated lower branch 38 and above the associated upstream pulley 34 and downstream pulley 36.

In FIGS. 8 to 12, the two belts 50, 52 are shown superimposed.

The first belt 50 and the second belt 52 are placed side by side, in a substantially symmetrical way with respect to a longitudinal vertical plane of symmetry forming a median plane for the belt 16.

The first belt 50 and the second belt 52 are driven independently, by a first servomotor 56 and a second servomotor 58 respectively.

In this case, each belt 50, 52 has a first catch 60, a second catch 62, and a third catch 64, which are regularly spaced along the belt 50, 52 and which are similar to the catches 26, 28 of the first embodiment.

It should be noted that the number of catches 60, 62, 64 could be different, the important requirement being that there is always a catch 60, 62, 64 in the upstream waiting position when a product Pn is detected by the cell 42, and that there are not two catches 60, 62, 64 simultaneously in the engaged position.

Preferably, the contact surface 66, or engagement surface, of each catch 60, 62, 64 with the products Pn is offset transversely toward the opposite belt 50, 52, in such a way that this contact surface 66 is generally centered transversely with respect to the belt 16.

This ensures that the engagement with the products Pn is substantially identical regardless of which catch 60, 62, 64 is engaged and regardless of which belt 50, 52 is in the active state.

In this case, the catches 60, 62, 64 have supplementary waiting positions, in addition to the positions described with reference to the first embodiment.

For example, with reference to the first belt 50, when the first catch 60 occupies its upstream waiting position and the second catch 62 occupies its downstream waiting position, the third catch 64 occupies a median waiting position, located halfway between the downstream waiting position and the upstream waiting position, in the vicinity of the third pulley 54.

Figure 8:
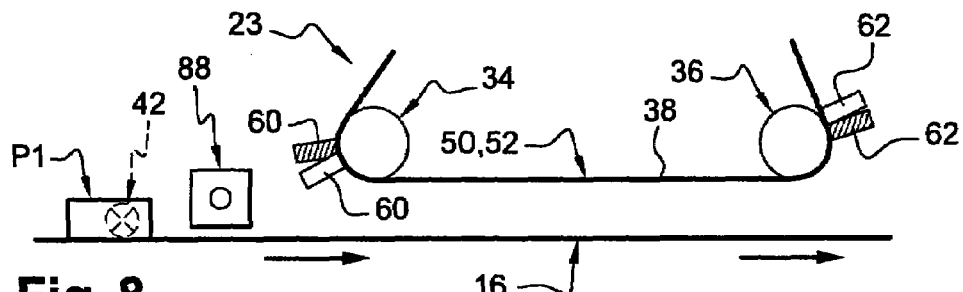
FIG. 8 is a view similar to that of FIG. 2, showing the phasing device of FIG. 6 with the two drive belts in the passive state.

In FIG. 8, the first catch 60 and the second catch 62 of the first belt 50 are shown, respectively, in their upstream and downstream waiting positions.

Since the catches 60, 62, 64 of the two belts 50, 52 cannot occupy identical positions simultaneously, when the first catch 60 of the first belt 50 occupies its upstream waiting position, the catches 60, 62, 64 of the second belt 52, shown with hatching in FIGS. 8 to 12, occupy waiting positions offset with respect to the waiting positions of the catches 60, 62, 64 of the first belt 50.

Thus, in FIG. 8, the first catch 60 of the second belt 52 occupies an upstream waiting position offset by several degrees of rotation of the upstream pulley 34 from the upstream waiting position of the first catch 60 of the first belt 50.

Similarly, the other two catches 62, 64 of the second belt 52 are offset with respect to the corresponding catches 62, 64 of the first belt 50.

The operating principle of the second embodiment is similar to the first, but it enables the flow of products to be processed at a higher speed. This is because the presence of a second belt 52 enables the formation of a second batch L2 to be started before the first batch L1 has been released by the first belt 50.

In FIG. 8, the phasing device 23 is shown in the passive state, the catches 60, 62, 64 occupying the waiting positions described above.

The detection signal emitted by the sensor 42, when it detects a first product P1, causes the first belt 50 of the phasing device 23 to change from its passive state to its active state.

Figure 9:
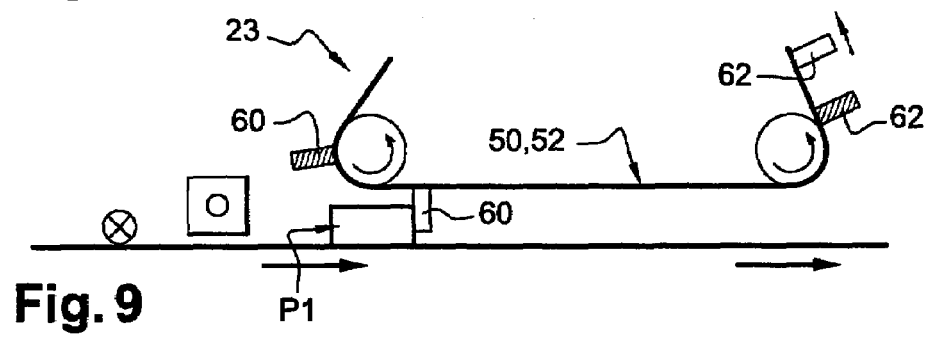
FIG. 9 is a view similar to that of FIG. 8, showing the phasing device with the first drive belt in the active state at the start of the engagement of a catch with a product, the second drive belt being in the passive state.
Figure 12:
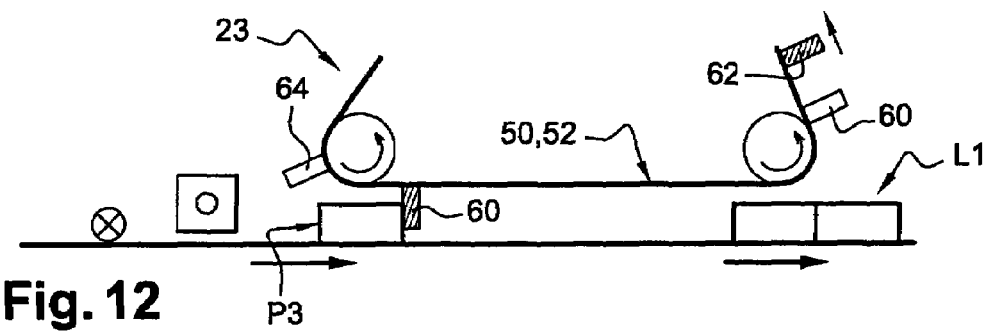
FIG. 12 is a view similar to that of FIG. 8, showing the first drive belt in the passive state and the second drive belt in the active state.

The first servomotor 56 is started so that the first catch 60 of the first belt 50 moves from its upstream waiting position to its engaged position, which is shown in FIG. 9, and continues to move to its downstream waiting position, which is shown in FIG. 12.

Shortly after the starting of the first servomotor 56, or at the same time, the second servomotor 58 is also started, until the first catch 60 of the second belt 52 occupies its upstream waiting position.

Figure 10:
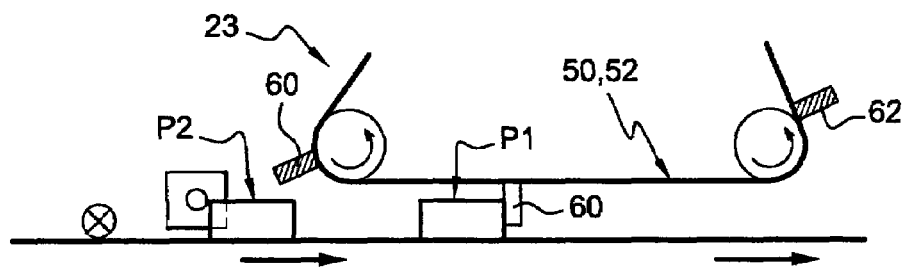
FIG. 10 is a view similar to that of FIG. 8, showing the deceleration of the product by the catch of the first drive belt and the upstream waiting position of a catch of the second drive belt.

As soon as the first catch 60 of the second belt 52 reaches its upstream waiting position, the second servomotor 58 is stopped while the arrival of a third product P3 is awaited, but the first belt 50 continues to be driven, as shown in FIG. 10.

The second product P2, located immediately upstream of the first product P1, progressively moves up to the first product P1, which is slowed down by the first catch 60 of the first belt 50, to form a first batch L1.

Shortly before the first catch 60 of the first belt 50 is retracted, the sensor 42 detects the arrival of a third product P3, which triggers the starting of the second servomotor 58, the second belt 52 then changing from its passive state to its active state.

Figure 11:
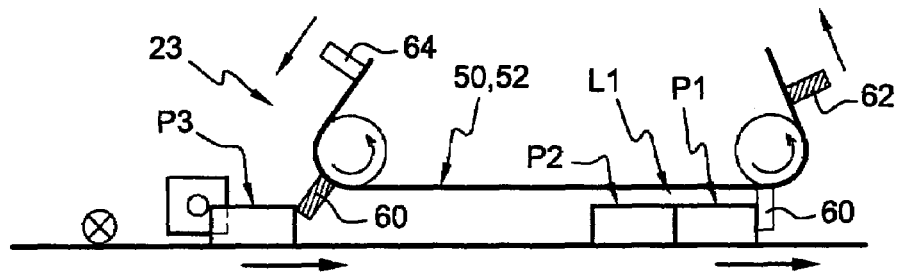
FIG. 11 is a view similar to that of FIG. 8, showing a first batch of products before it is released by the catch of the first drive belt, and showing the start of the engagement of a catch of the second drive belt with a product.

The first catch 60 of the second belt 52 then occupies an engaged position, shown in FIG. 11, so as to slow down the third product P3 to form a second batch L2, immediately upstream of the first batch L1.

When the first batch L1 has been formed, the first catch 60 of the first belt 50 is retracted and occupies its downstream waiting position, while the associated third catch 64 occupies its upstream waiting position, and the first servomotor 56 is then stopped. The first belt 50 has then returned to its passive state, as shown in FIG. 12.

The first belt 50 is again ready to process products Pn.

The first catch 60 of the second belt 52 continues its longitudinal movement, corresponding to the situation of the first belt 50 shown in FIG. 9.

The process is repeated in the same way for each catch 60, 62, 64 of each belt 50, 52 in accordance with the arrival of the products Pn.

Figure 7:
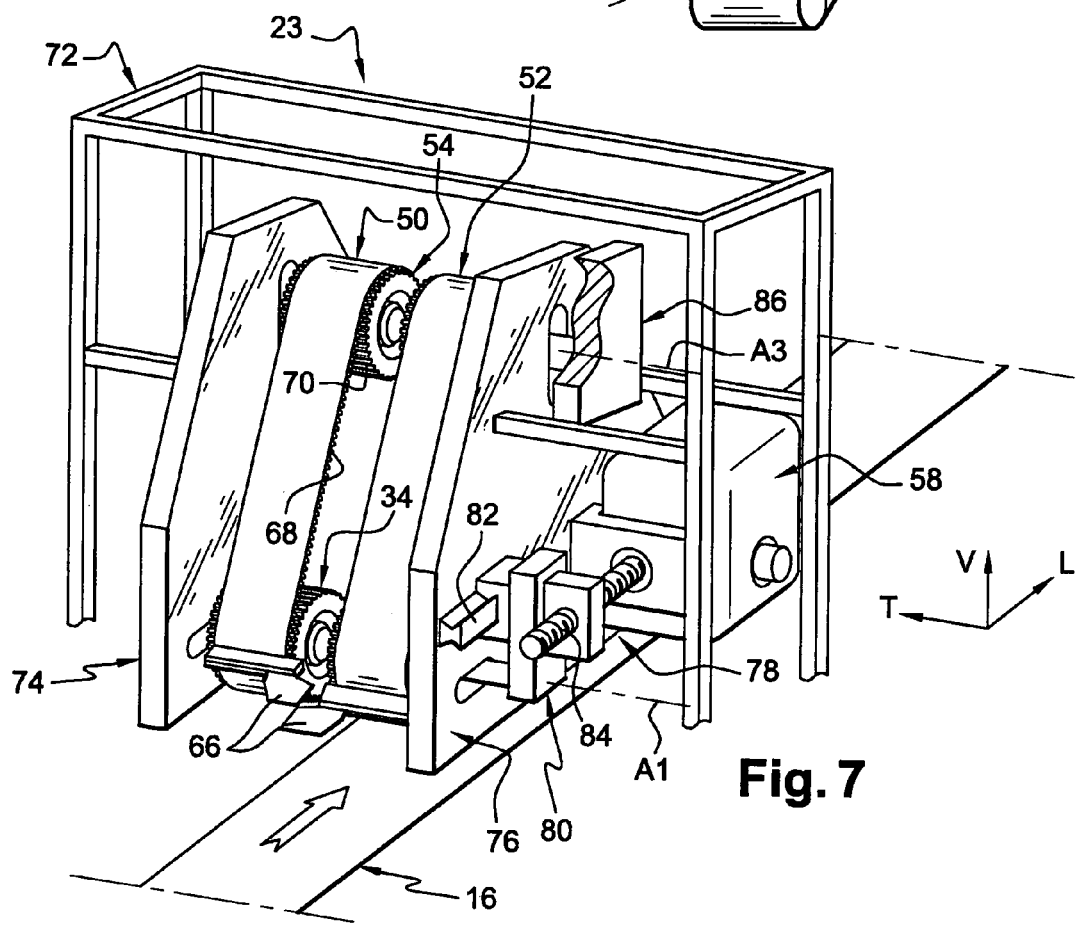
FIG. 7 is a perspective view showing the phasing device of FIG. 6 in a more detailed way.

The advantageous features of the preferred embodiment of the phasing device 22 according to the invention will now be described, with particular reference to FIG. 7.

Preferably, the inner surface 68 of the belts 50, 52 is toothed to interact with complementary transverse notches on the axial drive surface 70 of the pulleys 34, 36, 54.

In this case, the phasing device 23 is carried by a gantry-like frame 72 which rests, for example, on the ground (not shown), and which is fixed with respect to the belt 16.

It should be noted that the mounting of the phasing device 23 on a gantry 72 facilitates its placing above any conveyor belt 16, and facilitates the choice of its longitudinal position.

The gantry 72 has two vertical longitudinal plates 74, 76, one on each side of the belt 16, which support, respectively, the pulleys 34, 36, 54 associated with the first belt 50 and the pulleys 34, 36, 54 associated with the second belt 52.

Advantageously, the phasing device 23 has means 78 for adjusting the center to center spacing between the upstream pulley 34 and the downstream pulley 36 of each belt 50, 52.

The adjustment of the center to center spacing makes it possible, in particular, to adapt the length of the lower branch 38 of each belt 50, 52 to the upstream spacing E1 between the products Pn and to the longitudinal dimension of the products Pn.

In the embodiment shown here, the shaft A1 of each upstream pulley 34 is carried by a slide block 80 which is movable by translation on a longitudinal rail 82 fixed to the associated support plate 74, 76.

In this case, each slide block 80 is moved longitudinally by an adjusting screw 84 fixed to the associated support plate 74, 76.

Advantageously, the phasing device 23 has means 86 for correcting the tension of each belt 50, 52.

These means 86 include, for example, a vertical rail and slide block system (not shown), for moving the shaft A3 of the third pulley 54 by vertical translation, with respect to the associated support plate 74, 76.

The tension correcting means 86 can operate automatically, for example by means of a resilient device which vertically stresses the shaft A3 of the third pulley 54 in an upward direction.

According to another advantageous feature of the arrangement 10 according to the invention, a device 88 for ejecting products Pn is placed between the sensor 42 and the phasing device 23, so as to prevent malfunctions of the arrangement 10 due to excessively short upstream spacings E1.

The ejection device 88 has, for example, means (not shown) for producing a jet of compressed air capable of pushing a product Pn off the belt 16.

The ejection device 88 is operated according to the detection signal produced by the sensor 42, in such a way that, when the sensor detects the arrival of a product Pn upstream which is too close to the product Pn located immediately downstream, the ejection device 88 causes the upstream product Pn to be ejected from the belt 16.

If the ejected product Pn was intended to form the first product P1 of a batch Ln, the phasing device 23 waits for the arrival of the next product Pn to start the formation of a new batch Ln.

If the ejected product Pn was intended to form the second product P2 of a batch Ln, the phasing device 23 releases the first product P1 of the batch Ln, although a second product P2 has not yet moved up to it, in other words although the corresponding batch Ln has not been formed.

The first product P1 then enters the corresponding cell 46 of the assembly unit 24 on its own.

The assembly unit 24 can have means (not shown) for detecting the number of products Pn received in the cell 46 located facing the belt 16, in such a way that it waits for the arrival of the second product P2 before causing the movement of the cells 46.

The phasing device 23 therefore allows the second product P2, located immediately upstream of the ejected product Pn, to pass without slowing it down, so that it meets the first product P1 which is already present in the cell 46.

The operation of the arrangement 10 according to the invention can then continue according to the normal operating routine.

It should be noted that, when the value of the upstream space E1 between two products Pn is larger than the set value, it is unnecessary to use the ejection device 88, since the phasing device 23 is capable of dealing with the situation by following the normal operating routine.

In the embodiments which have been described and illustrated, the arrangement 10 according to the invention forms batches Ln of two products Pn.

However, this arrangement 10 is capable of forming batches Ln of more than two products Pn, for example batches of three products Pn. For this purpose, the phasing device 22 has to slow down the first product P1 of the batch Ln until the two products P2, P3 located immediately upstream move up to it.

The arrangement 10 according to the invention requires no special belt 16, thus enabling costs to be minimized and making it possible, for example, to modify an existing installation at low cost to make it capable of processing products Pn at high speed.

Finally, the invention relates to a method of assembling a plurality of products in the form of batches in order to allow them to be packaged, the products being transported by a conveyor belt which runs at a specified speed called the running speed, the products arriving at the upstream end of the belt with a specified upstream spacing between two products, and the products leaving the downstream end of the belt in batches of at least two products.

The assembly method consists of:
- a deceleration step during which a first product is slowed down on the belt, with respect to the second product located immediately upstream, without modifying the running speed of the belt, at least until the spacing between the second product and the first product reaches a predetermined value, so as to form a batch of at least two products,
- a second step of release, during which the first product is released in such a way that the batch moves downstream at the running speed of the belt.

The invention claimed is:

1. An arrangement (10) for assembling a plurality of products (Pn) in the form of batches (Ln), the arrangement configured so that the products (Pn) are transported on at least one conveyor belt (16) which runs in a longitudinal direction from an intake zone (18) upstream to an exit zone (20) downstream, at a specified speed (V1) known as a running speed, in which the products (Pn) arrive with a specified upstream spacing (E1) between two products (Pn), and the arrangement having a phasing device (22, 23) which is placed on a path of the products (Pn) so as to form batches (Ln) of at least two of the products (Pn), the phasing device (22, 23) being placed between the intake zone (18) and the exit zone (20) of the belt (16) and having at least one retractable catch (26, 28, 60, 62, 64) which moves successively into:

at least one engaged position in which the catch (26, 28, 60, 62, 64) is interposed, by contact, before a first product (P1) in order to slow it down until at least a second product (P2) located immediately upstream moves up to it, so as to form a batch (L1), and at least one retracted position which allows the previously formed batch (L1) to continue moving downstream at the running speed (V1), said phasing device (22, 23) having at least one drive belt (30, 50, 52) which has a passive operating state in which it is stopped, each catch (26, 28, 60, 62, 64) occupying a retracted waiting position, and an active operating state in which the belt (30, 50, 52) is rotated around at least two drive pulleys (34, 36, 54) in such a way that a catch (26, 28, 60, 62, 64) is moved longitudinally downstream in the engaged position.

2. The arrangement (10) as claimed in claim 1, wherein for each batch (Ln) to be formed, the belt (30, 50, 52) is changed to the active operating state when the first product (P1) is detected by a sensor (42) upstream of the phasing device (22, 23).

3. The arrangement (10) as claimed in claim 2, wherein the catch (26, 28, 60, 62, 64) is moved from an engaged position toward the retracted waiting position when the spacing between the two products (P1, P2) of the batch (L1) reaches a specified value other than zero.

4. The arrangement (10) as claimed in claim 3, wherein in the engaged position, the catch (26, 28, 60, 62, 64) is moved in longitudinal translation downstream, at a specified speed (V2) called the deceleration speed, which is less than the running speed (V1), until the batch (L1) is formed.

5. The arrangement (10) as claimed in the claim 4, wherein the at least one drive belt (30, 50, 52) of the phasing device (22, 23), which carries at least one catch (26, 28, 60, 62, 64), is placed above an upper face (32) of the belt (16), in that the belt (30, 50, 52) is wrapped around the at least two drive pulleys (34, 36, 54) in such a way that a lower branch (38) of the belt (30, 50, 52) extends substantially parallel to the upper face (32) of the belt (16), the catch (26, 28, 60, 62, 64) occupying engaged positions when the catch is located on the lower branch (38), and in that the phasing device (22, 23) has means (40, 56, 58) for rotating the pulleys (34, 36, 54) in such a way that a longitudinal speed (VL) at which the catch (26, 28, 60, 62, 64) driven by the belt (30, 50, 52) is equal to the deceleration speed (V2).

6. The arrangement (10) as claimed in the claim 1, wherein the phasing device (23) has a first (50) and a second (52) drive belt which are similar and placed in parallel, and which are driven independently, and in that each belt (50, 52) is changed to the active operating state before the end of the active operating state of the other belt (50, 52), in such a way that the forming of a batch (Ln) starts before the preceding downstream batch (Ln) has been released.

7. The arrangement (10) as claimed in the claim 6, wherein when the two belts (50, 52) are in the passive operating state, the waiting positions of the catches (60, 62, 64) of the first belt (50) are offset with respect to the waiting positions of the catches (60, 62, 64) of the second belt (52), so as to prevent crossing of the catches (60, 62, 64) of the two belts (50, 52).

8. The arrangement (10) as claimed in claim 6, wherein each belt (30, 50, 52) carries at least two similar catches (26, 28, 60, 62, 64) which are spaced regularly along the belt (30, 50, 52) in such a way that, for each belt (30, 50, 52), only one catch (26, 28, 60, 62, 64) can occupy an engaged position at any time.

9. The arrangement (10) as claimed in claim 6, wherein the phasing device (22, 23) has means (80) for adjusting a center to center spacing between the two pulleys (34, 36) of each belt (30, 50, 52), in order to adapt a length of a lower branch (38) of each belt (30, 50, 52) to dimensional and spatial characteristics of the products (Pn).

10. The arrangement (10) as claimed in the claim 9, wherein the phasing device (22, 23) has means (86) for automatically correcting a tension of each belt (30, 50, 52) in accordance with a value of the center to center spacing between the two pulleys (34, 36).

11. The arrangement (10) as claimed in claim 10, wherein the arrangement has an assembly device (24) with cells (46) which is placed at the exit zone (20) from the belt (16), each cell (46) being designed to contain the batch (Ln) of products (Pn) and to convey the batch (Ln) toward a downstream processing station.

* * * * *